Feb. 7, 1928.
E. E. WITTKOPP
1,658,623
TIRE AND RIM CONSTRUCTION
Filed Sept. 17, 1926 4 Sheets-Sheet 1
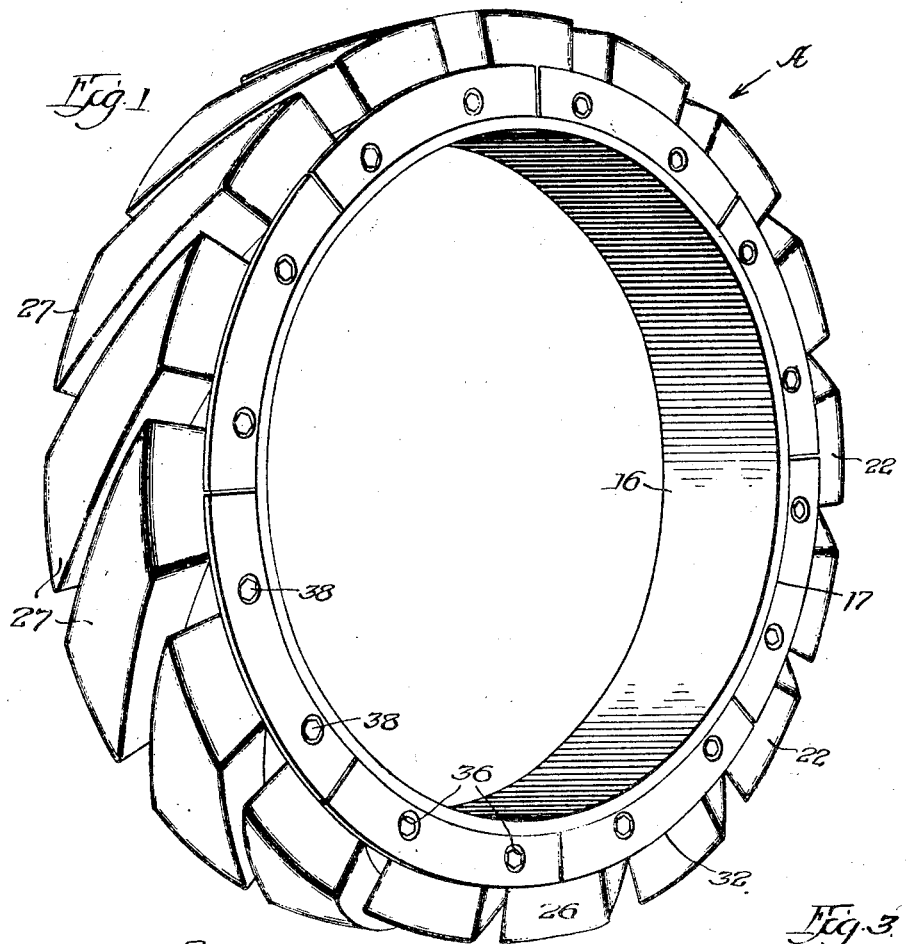
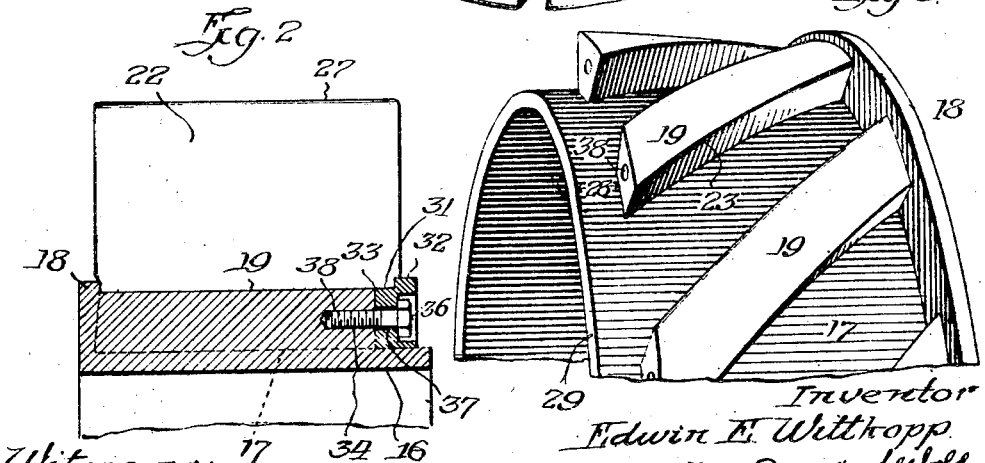

Feb. 7, 1928.
E. E. WITTKOPP
1,658,623
TIRE AND RIM CONSTRUCTION
Filed Sept. 17, 1926    4 Sheets-Sheet 2
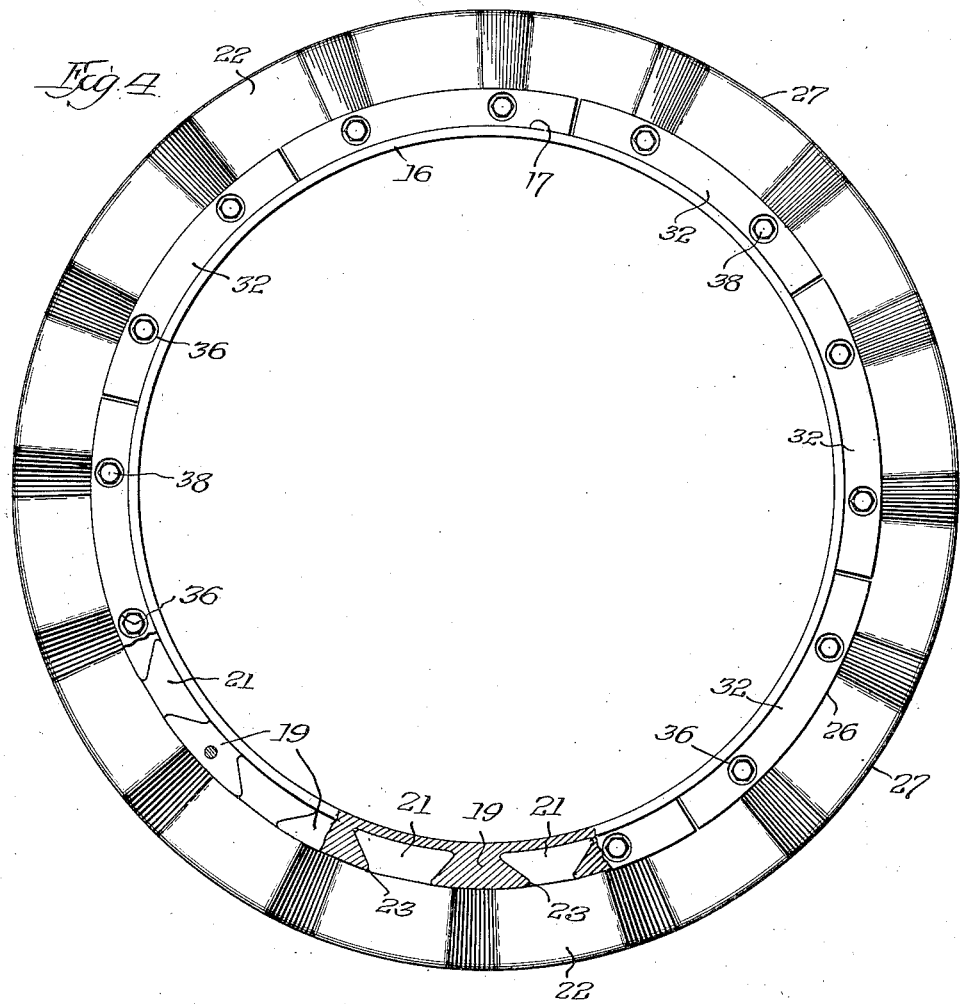
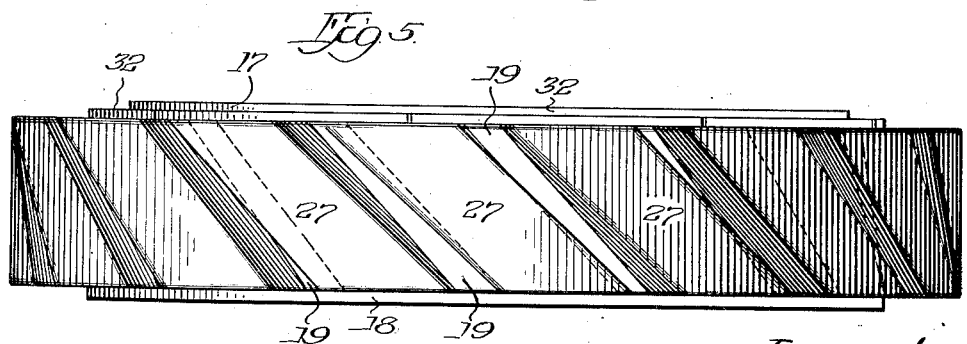
Inventor
Edwin E. Wittkopp

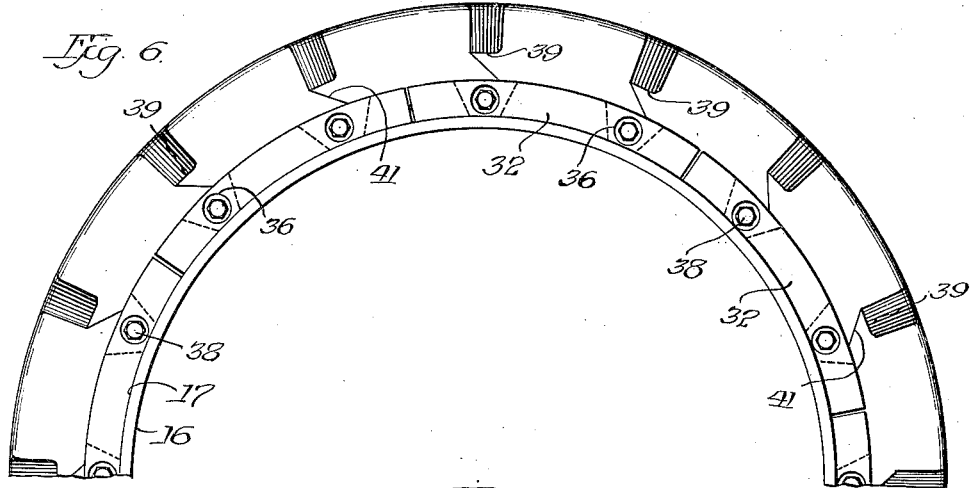
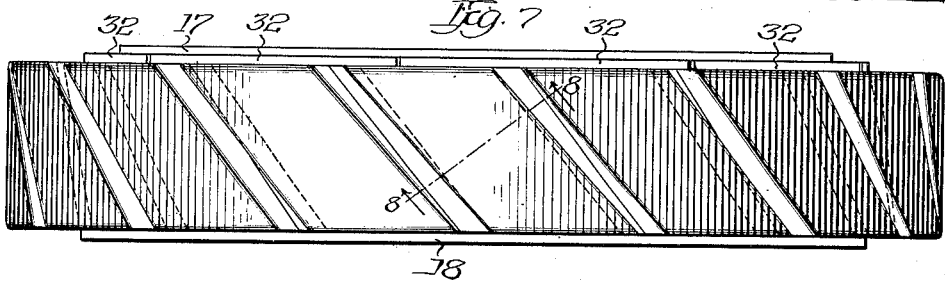
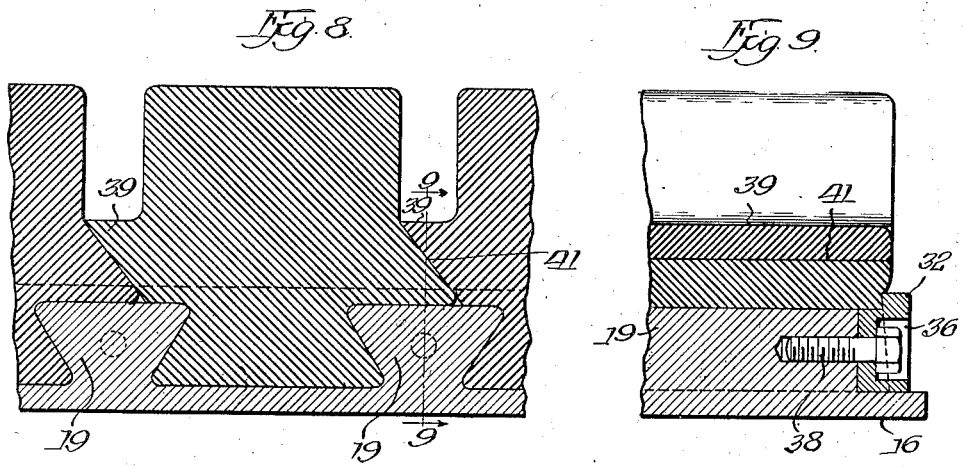

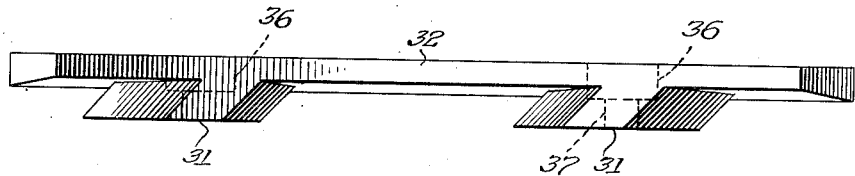
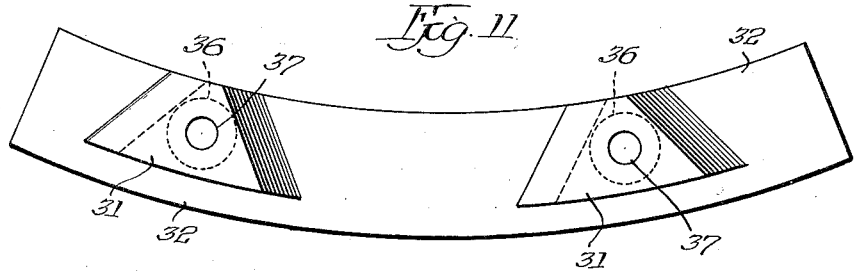
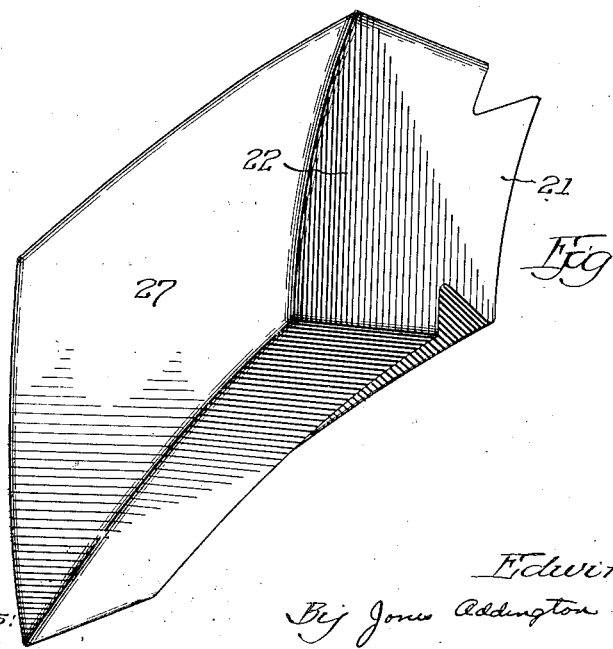

Patented Feb. 7, 1928.

1,658,623

UNITED STATES PATENT OFFICE.

EDWIN E. WITTKOPP, OF CHICAGO, ILLINOIS, ASSIGNOR OF FORTY PER CENT TO JOSEPH S. SZARAT, OF CHICAGO, ILLINOIS.

TIRE AND RIM CONSTRUCTION.

Application filed September 17, 1926. Serial No. 136,104.

My invention relates to tires for vehicle wheels and particularly to tires built in sections and adapted for use on heavy duty vehicles, such as trucks and the like.

The heretofore common practice of equipping trucks and heavy motor cars with solid rubber tires in which the rubber tread is remolded into the rim and the rim pressed into the felloe of the wheel has many disadvantages, one of which is the delay caused by the manner in which repairs are forced to be made by reason of such construction.

With the type of heavy truck tires in use at the present time it is necessary to raise the truck on a jack and remove the entire wheel for making repairs. This, besides being irksome, is expensive in that the truck is out of commission until the tire has been repaired and replaced on the wheel. It also follows that when large gashes are cut in the surface of the tread, or where the tire becomes unevenly worn a replacement of the entire tire is necessary and the metal rim and rubber tread are both scrapped.

In my invention the tread is built of sectional rubber blocks properly secured upon the rim in a quick and facile manner so that replacement of sections or portions of the tire may be readily made and without the necessity of raising the truck on a jack and removing the wheel from the axle. In case a tire becomes unevenly worn, the portion or segment so worn as to require replacement may be easily removed by an unskilled attendant and the new segment or segments inserted. It will also be apparent that even if one or more segments of a previously worn tire should require replacement, segments, conforming to the previously worn segments still in good condition upon the rim, could be inserted therein in place of the damaged sections so that no unevenness would be apparent on the tread of the wheel.

Experiment has also proven that sectional solid rubber tires are more resilient than continuous solid rubber tires and the tractive effect is decidedly better in tires composed of sections.

One of the objects of this invention is to provide a sectional solid rubber tire.

A further object of the invention is to provide a rim which may be cast to shape and which will provide means for holding the tire sections against displacement.

Still a further object of my invention is to provide a tire construction in which there will be no protruding bolt heads or other obstacles and in which the tire sections can be passed laterally between the holding means provided on the rims and which, when so engaged, will be provided with reenforcing members which will positively prevent their being withdrawn, except laterally and at the will of the mechanic or driver.

Other objects and advantages of this invention will be readily appreciated as the same becomes better understood by reference to the following description when considered in connection with the accompanying drawings, in which—

Figure 1 is a perspective view of my improved tire and rim showing the one form of sectional block employed;

Fig. 2 is a cross-sectional view through one of the laterally extending receiving portions;

Fig. 3 is a perspective view looking in the direction of the arrow A in Figure 1 of part of the rim with the blocks and sectional flange removed;

Fig. 4 is a side view showing a portion in longitudinal section;

Fig. 5 is a top plan view of the same;

Fig. 6 is a front view of a portion of a tire and showing a different type of sectional block;

Fig. 7 is a top plan view of the same;

Fig. 8 is an enlarged sectional view taken on the oblique line 8—8 of Fig. 7;

Fig. 9 is a vertical sectional view taken on the line 9—9 of Fig. 8;

Fig. 10 is a bottom edge view of one of the engaging flange members;

Fig. 11 is a rear side view of the same; and

Fig. 12 is a perspective view of one type of sectional block used.

In each of the figures of the drawings, like reference characters indicate like parts.

Referring more particularly to the drawings, the rim 16 is fitted onto the felloe of an ordinary automobile wheel and when once placed thereon with a driving fit need never be taken therefrom. This rim 16 comprises a tire supporting member 17 and an outwardly extending flange 18 on the inner edge thereof, while at suitable intervals the tire supporting member is provided with tire clamping or securing members 19. These members are so arranged that they form dove-tail slots between the same, into which dove-tail portions 21 on the solid rubber segments 22 are adapted to be positioned by passing them lengthwise between said members until their inner ends strike against the flange 18.

The dove-tail portions 21 on the solid rubber segments 22 conform to and are shaped to fit the dove-tail slots provided between the adjacent tire clamping members. The tread portion 26 of the solid rubber segments 22 are also curved in precisely the same manner as the tire clamping members 19 so that each point in their periphery coincides with a circumferential line whose radius is drawn from the center of the wheel. The outer faces 27 of the segments 22 will, therefore, present the appearance of being spirally located, all of which has been found to produce the best results, both as to tractive effect and for eliminating the possibility of forcing the dove-tail from between the tire clamping members, as the resistance to the tractive forces will be distributed as the wheel turns.

The tire clamping members 19 are preferably formed integral with the tire supporting member and the inner end of the same abuts the flange 18, while the outer end thereof is set back a short distance as at 28 from the outer edge 29 of the said rim. The rubber segments 22 are longer than the tire clamping members 19 and extend beyond the same as at 31 and engage the flange member 32 which has inner projections 33 thereon, which said projections conform to and act as an extension of the tire clamping members 19, and are adapted to be clamped onto said clamping members by passing cap screws 34 through the counter-bored holes 36 and holes 37 in the projections into threaded holes 38 in said clamping members. By using engaging flange members with projections conforming to the clamping members, the rubber segments can be securely squeezed into proper clamping position and the screw heads will lie within the counter-bored holes 36 so that there will be no projecting portions whatsoever. The solid rubber segments 22 have their tread portion 27 wide enough so that a portion on each side of the same raises upon the entire clamping members 19. This provides a certain degree of rigidity which would not be present if the dove-tail portion were made integral with the rim and extended through a dove-tail slot in the segment, in which case each of the edges of the segment would be capable of being depressed a further distance by reason of the rubber in the same extending from the outer periphery of the segment to the tire supporting member of the rim. The segments may be of any desired width and length, although for the ordinary truck about 16 segments have been found to give the desired results.

Figure 6 shows a segment which at one side of the same has an overhanging portion 39, while at the other side is a complimentary portion 41 which fits under the overhanging portion 39 of the successive segments and forms an effectual seal against water, mud, etc., and which also adds a certain amount of rigidity to the tread without in any manner diminishing the resilient effect thereof. This form of segment is illustrated in Figs. 8 and 9 and with the exception of the overhanging and complementary portions is precisely the same as the tire shown in Figs. 1 to 5, inclusive.

While I have shown and described preferred embodiments of my invention, it should be understood that the details of construction are capable of wide modification and variation without departing from the spirit of the invention or sacrificing any of its advantages. Hence, I reserve all such variations, modifications and mechanical equivalents as fall within the spirit and scope of the appended claims.

This application is a continuation as to common subject-matter claimed in my co-pending application, Serial No. 99,055, filed April 1, 1926.

I claim:

1. A rim and tread construction comprising a rim having a series of similar spiral dovetail recesses therein, and a series of tread members having spiral dovetail portions secured and fitting snugly in said dovetail recesses, respectively, the edges of said spiral recesses and spiral dovetail portions, and the outer faces of said tread members lying substantially in cylindrical surfaces which are coaxial with said rim whereby the dovetail portions of the tread members may be inserted into the dovetail recesses by a spiral movement, and whereby the wear portions of the tread members are of substantially uniform thickness.

2. A rim and tread construction comprising a rim having a series of similar spiral dovetail recesses therein, and a series of tread members having spiral dovetail portions secured and fitting snugly in said dovetail recesses, respectively, the edges of said spiral recesses and spiral dovetail portions and the outer faces of said tread members lying substantially in cylindrical surfaces which are coaxial with said rim whereby the dovetail portions of the tread members may be inserted into the dovetail recesses by a spiral movement, and whereby the wear portions of the tread members are of substantially uniform thickness, the outer faces of adjacent tread members being spaced from each other, said tread members having portions overlying and covering those portions of the rim between the dovetail recesses whereby the tread members abut and support each other and the outer face of the rim is substantially covered by the tread members.

3. A rim and tread construction comprising a rim having a series of spiral recesses therein and a series of tread members having spiral portions secured and fitting in said spiral recesses, the edges of said spiral recesses and spiral portions and the outer faces of said tread members lying substantially in cylindrical surfaces which are coaxial with said rim whereby the spiral portions of the tread members may be inserted into said spiral recesses by a spiral movement.

In witness whereof, I have hereunto subscribed my name.

EDWIN E. WITTKOPP.